Patented Apr. 17, 1923.

1,451,843

UNITED STATES PATENT OFFICE.

HERMANN PLAUSON, OF HAMBURG, GERMANY.

MANUFACTURE OF RESINOUS CONDENSATION PRODUCTS.

No Drawing.   Application filed February 12, 1921.   Serial No. 444,499.

*To all whom it may concern:*

Be it known that I, HERMANN PLAUSON, Esthonian subject, residing in Hamburg, Germany, have invented certain new and useful Improvements in the Manufacture of Resinous Condensation Products, of which the following is a specification.

The known products of phenols and formaldehyde are usually fragile.

According to this invention condensation is effected between formaldehyde or polymers thereof and phenols but vinyl compounds or polymers thereof are also used when the reaction proceeds in a different manner giving new resinous products which are tougher and more soluble than those made by the usual process. They are soluble in acetone and alcohol, and also in nitrohydrocarbons; they are more or less soluble in some chlorinated hydrocarbons and they swell in others.

These properties are valuable since excellent and yet cheap varnishes can thus be made from the products. The varnishes from the usual alcohol soluble products have the disadvantage that they leave a coating which remains tacky for a long time so that they are used with the so-called varnish ovens. Further their characteristic, permanent and intense phenolic odour is unpleasant. They often lose their colour after keeping, and finally they do not adhere well to surfaces which are at all flexible.

The new resins and varnishes made therefrom overcome these disadvantages, and further possess the property of taking up certain oils and esters in certain proportions so that non-fragile articles can be prepared in a simple way. Suitable additions will impart a certain flexibility or elasticity.

The condensation may be performed in presence of the vinyl compounds or polymers or these may be added to the condensed product and heated therewith.

It could not have been foreseen that condensation products of special toughness and strength, &c., could be made in this way. It would have been expected on the contrary that vinyl halides for example would exert a disturbing action on the condensation of phenol and formaldehyde since it is known that halogen acids are unfavourable to the reaction and deteriorate the condensation product, and vinyl halides are esters of these acids, which are probably present during the reaction. It is found in practice, however, that the reaction is successful with vinyl halides.

It has previously been proposed to prepare plastic masses by polymerization of organic vinyl esters alone but this invention depends on the mutual and apparently chemical interaction between vinyl compounds and phenol formaldehyde and the production of a new homogeneous resin with special properties. The product appears to be a chemical compound or compounds and not a mere mixture since it is soluble in solvents which do not dissolve polymerized vinyl esters. The properties of the new resin, namely strength, a certain flexibility, capacity for being moulded and solubility are characteristic and different from those of either the polymerized vinyl compounds alone or the ordinary formaldehyde phenol resins. The process is illustrated by the following examples: —

Example 1.

94 parts of crystallized phenol, 28 to 30 parts of finely powdered trioxymetheylene and 86 parts of vinyl acetate ($CH_2:CH.O.CO.CH_3$) are heated together in a closed vessel at a temperature of 70°–120° C., preferably with stirring, till a homogeneous liquid is obtained. The vinyl acetate takes part in the condensation.

The product is subjected to a short vacuum distillation at 100° C. to remove unchanged reagents. After cooling it is solid and tough, and it becomes harder in time or on heating under pressure. Unlike the pure phenol formaldehyde resin it is non-fragile and almost colourless or only faintly yellowish. The product can be softened by heating with or without solvents specially in presence of oils, esters or the like, when it can be moulded into various objects e. g. knobs, screws, etc. Plates so made can be easily worked e. g. filed, sawed, cut, etc, They can be stuck together by softening or dissolving the surface with certain chlorinated hydrocarbons e. g. chlorbenzene, dichlorhydrin, epichlorhydrin, or with acetone, mesityl chloride, &c.

By solution in certain chlorinated hydrocarbons or in vinyl esters, with or without addition of oils, &c., varnishes can be made for impregnation purposes e. g. for impregnating pulverulent or fibrous substances.

Pure vinyl acetate may be replaced by other esters e. g. chlor-, oxy-, amido- and aryl- acetic esters, also propionic esters. Polymerized vinyl esters can also be used. Vinyl ethers can be used e. g. vinyl ethyl ether or vinyl propyl ether or vinyl halides are applicable.

Instead of formaldehyde or trioxymethylene, it is possble to use paraformaldehyde, hexamethylene tetramine or the like. If desired two molecular proportions of vinyl compound can be used with one molecular proportion of phenol and one molecular proportion of trioxymethylene (calculated as formaldehyde) or the proportions may be reversed. The properties of the resulting resin can be accordingly varied.

Example 2.

The same reagents and proportions are used as in example 1 but the vinyl acetate is added at the end of the reaction between the other ingredients. An autoclave may be used. The mixture is best stirred and heated under pressure at 120° C. till a sample shows the desired properties. The product is further treated as in example 1.

Example 3.

94 parts of crystallized phenol, about 63 to 65 parts of hexamethylenetetramine and 63 to 65 parts of a vinyl chloride polymerization product are heated to 80°–90° C. with continual stirring. If the exothermic reaction is too vigorous, the mixture must be cooled. After some time the mass is liquid and homogeneous. Impurities and uncondensed reagents are removed by distillation in vacuo at 100° to 105° C. A clear homogeneous liquid is obtained which is gradually converted into a solid tough mass. By subsequent heating to 100°–120° C. it becomes firmer and more resistant but darker in colour. By heating to 80°–90° C. for a longer or shorter time at 5 to 10 atmo., pressure a lighter coloured mass can be obtained. Other vinyl halides can be used instead of vinyl chloride. The same result can be obtained with the impolymerized vinyl compounds if the process is performed under pressure at 100°–120° C. The vinyl chloride must either be first liquefied and added as a liquid or forced into the pressure-vessel by a compressor. The reaction is accelerated by the addition of small quantities e. g. 1 to 3% of an organic anhydride or superoxide or even ¼ to 1% of a non-explosive ozonide.

Example 4.

The raw materials are mixed in the same proportions as in example 3 and 15 to 30 parts of the mixture are dissolved in a common low-boiling solvent e. g. methyl alcohol, ethyl alcohol or acetone. This solution is used to impregnate wood, paper, cellulose, &c., in pulverulent or fibrous form, or asbestos, graphite or the like; the solvent is then evaporated at the lowest possible temperature. The impregnated material is first heated before or after moulding into plates or other objects; heating is continued for a suitable time at 100°–120° C. or over, when a homogeneous condensation product is obtained which is a good insulator and is very tough. The resulting composite mass is very strong.

In the claims the word formaldehyde includes its polymers as these are known equivalents therefor.

Having now particularly described and ascertained the nature of my said invention and in what manner the same is to be performed, I declare that what I claim is:—

1. Process for the preparation of synthetic resins consisting in condensing a phenol and formaldehyde with a vinyl compound.

2. Process for the preparation of synthetic resins consisting in condensing a phenol and formaldehyde with a vinyl compound in two stages by first condensing the phenol with the formaldehyde and then condensing the vinyl compound with the intermediate product so formed.

3. Process for the preparation of synthetic resins consisting in condensing a phenol and formaldehyde with a polymerized vinyl compound.

4. Process for the preparation of synthetic resins consisting in condensing a phenol and formaldehyde with a polymerized vinyl compound, in two stages, by first condensing the phenol with the formaldehyde and then condensing the vinyl compound with the intermediate product so formed.

5. Process for the preparation of synthetic resins consisting in condensing a phenol and formaldehyde with a vinyl compound in presence of an accelerator.

6. Process for the preparation of synthetic resins consisting in condensing a phenol and formaldehyde with a polymerized vinyl compound in presence of an accelerator consisting of an organic oxide.

7. Process for the preparation of synthetic resins consisting in condensing a phenol and formaldehyde with a vinyl compound in presence of a common solvent and then removing the solvent.

8. Processes for preparing varnishes being solutions of synthetic resins which consists in condensing a phenol with formaldehyde and a vinyl compound in presence of a common solvent.

9. A synthetic resin being a condensation product of phenol, formaldehyde and a vinyl compound.

In witness whereof, have hereunto signed name in the presence of two subscribing witnesses.

HERMANN PLAUSON.

Witnesses:
N. H. ARMSTRONG,
W. H. BEESTON.